United States Patent Office 3,400,889
Patented Sept. 10, 1968

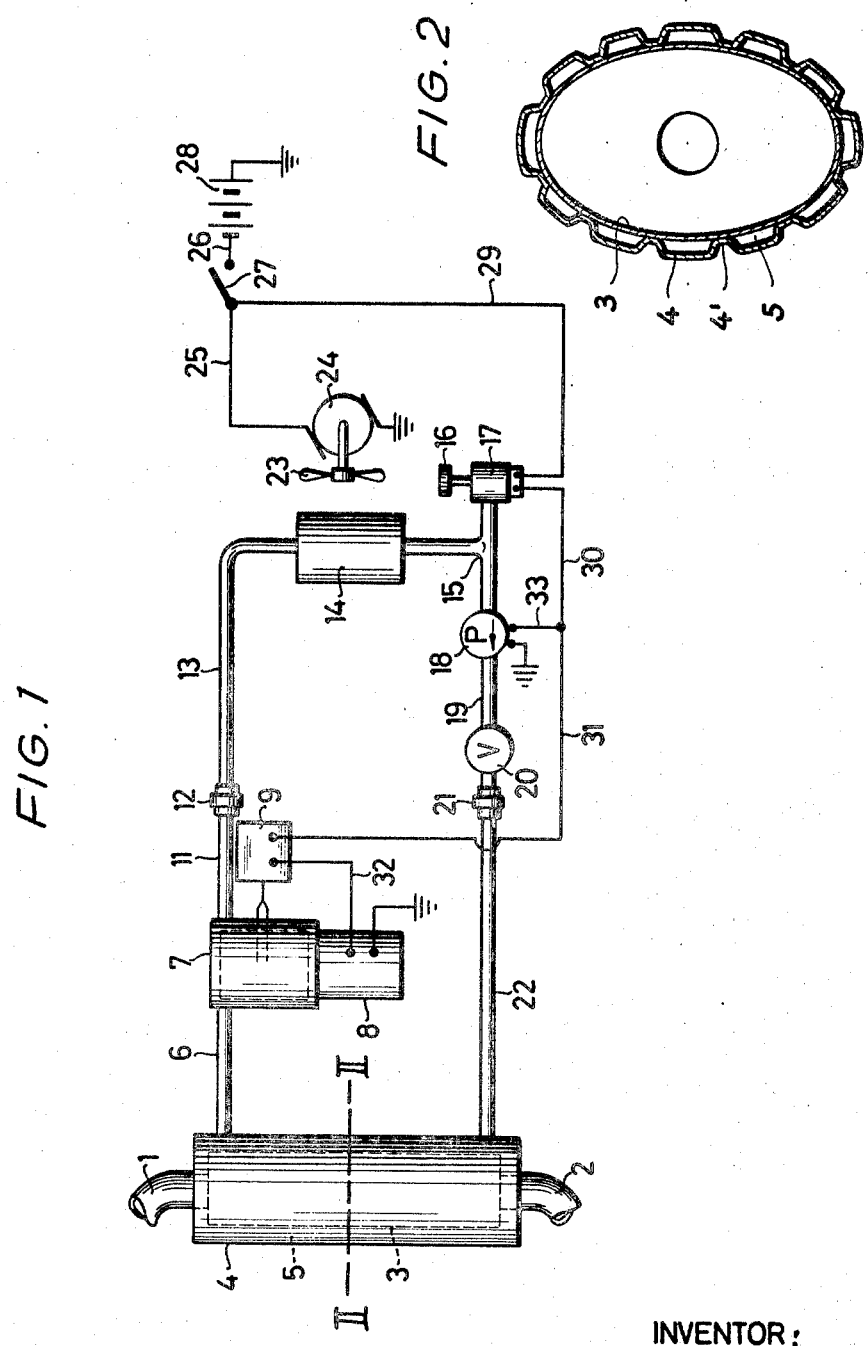

3,400,889
AUTOMOTIVE VEHICLE SPACE
HEATER SYSTEM
Karl Hoyer, Leinfelden, Wurttemberg, Germany, assignor to Robert Bosch G.m.b.H., Stuttgart, Germany, a limited-liability company of Germany
Filed Mar. 23, 1966, Ser. No. 536,828
Claims priority, application Germany, Apr. 30, 1965,
B 81,681
1 Claim. (Cl. 237—9)

ABSTRACT OF THE DISCLOSURE

An evaporative type heat exchange fluid, such as Freon, is placed in a heat exchange circuit including, in series: an evaporator type heat exchanger placed around the muffler; a second evaporator type heat exchanger, separately powered by the gasoline burner; a condenser, to operate as a space heater; and a circulating pump. A pressure sensing device, sensing the heat exchange fluid pressure, is included in the circuit, as well as a thermostat sensing temperature at the second, gasoline fired heat exchanger. Upon starting of the system, heat will be applied to the evaporator by the second, gasoline fired heat exchanger if: (a) the pressure in the system is low (indicating absence of sufficient heat from the muffler-type heat exchanger) and (b) the temperature at the gasoline fired heat exchanger is below a predetermined value indicating that heat may be supplied.

The present invention relates to a space heater, and more particularly to a heater for automotive vehicles, which utilizes a heat exchange fluid, preferably Freon, which is alternatively evaporated and condensed.

Muffler heaters capable of exchanging heat derived from exhaust gases are particularly adapted for vehicles having air-cooled engines; unfortunately, however, when outside temperatures are very low the heat obtainable from such heaters is insufficient; when the engine is stopped, no heat is available; and when the engine is idling, only little heat can be obtained.

Separate, usually gasoline fired heaters operating independently of the engine, have been proposed. These heaters have the disadvantage that they require a separate control. Such control can be obtained by a timer switch.

It is an object of the present invention to provide a heating system which will be efficient even with very low outside temperatures, when the engine is idling, or stopped, and which does not require manual supervision by the user.

It is another object of the present invention to provide a heating system which provides even temperature for the interior of a vehicle, independent of outside temperature and vehicle engine operation, and whether the vehicle's windows are closed or not; and which is secure against excessive heating in case the engine operates under high power, while the vehicle's windows are open.

Briefly, in accordance with the present invention, a heat exchange fluid circuit is provided charged with a heat exchange fluid such as Freon. The heat exchange fluid circuit contains a first evaporator heat exchanger, taking heat, for example from the exhaust system of the engine, such as a muffler heater; and, in series therewith, a second evaporator heat exchanger deriving heat from a separate additional source, for example a gasoline fired heater. A condenser, preferably combined with a blower, yields heat derived from the heat exchange fluid in the condenser into the space to be heated, for example the vehicle. Automatic operation is achieved by putting a pressure sensitive switch into the fluid circuit, which pressure sensitive switch controls a pump to circulate the heat exchange fluid, that is the Freon, in the heat exchange fluid circuit. The second evaporator heat exchanger is controlled by a thermostat electrically in series with the pressure sensitive switch.

The structure, organization and operation of the invention will be described more specifically in the following detailed description with reference to the accompanying drawings, wherein:

FIG. 1 is a schematic drawing of a space heater arrangement in accordance with the present invention; and FIG. 2 is a schematic, cross sectional view of a muffler heater and taken along lines II—II of FIG. 1.

The invention will be illustrated as applied to an automotive vehicle. Connections 1 and 2 illustrate the exhaust gas conduction pipes, or exhaust pipes, of an automotive vehicle, not otherwise shown. The muffler body 3, connected into the exhaust pipes 1, 2, is covered by a jacket 4 of sheet metal, having depressions 4' formed therein, contacting the muffler 3, and forming points or lines at which the sheet metal jacket 4 is secured to the muffler body 3. The jacket 4 may be preformed and then welded to the muffler 3. Alternatively, a sheet metal sleeve, or plate, may be welded along predetermined lines to the muffler body 3; a pressure medium is then introduced between the muffler body 3 and the sheet metal sleeve to deform and expand the sleeve, or plate, into the form of the jacket 4, as best seen in FIG. 2. Between the depressions, channels 5 are formed, through which a heat exchange fluid, preferably Freon (a chlorfluor derivative aliphatic hydrocarbon, specifically dichlorodifluoro-methane) can circulate. The walls defining the channels 4 form the first evaporator-type heat exchanger. Connection tubing 6 connects the first evaporator heat exchanger 3–5 to a second evaporator-type heat exchanger 7. Heat exchanger 7 is adapted to be heated by a gasoline fired heater 8, controlled by a thermostat 9 sensitive to the temperature within heat exchanger 7. Heat exchanger 7 and heater 8 are known in the art, and commercially available automatic heater units. Heater unit 7, 8, controlled by thermostat 9, is arranged so that when the temperature at the heat exchanger 7 drops below a predetermined value, thermostat 9 switches heater 8 ON; and disconnects heater 8 when the temperature is heat exchanger 7 exceeds a predetermined limit.

Heat exchanger 7 is connected by means of a tubing 11, coupling 12, and tubing 13 to a condenser 14. A T-connection 15 is secured to condenser 14, connecting condenser 14 both to a pressure sensitive switch 17, which is adjustable, for example by an adjustment knob 16, and to a pump 18. The pressure sensitive switch is sensitive to the pressure within the fluid circuit and is so arranged that when the pressure exceeds a certain value as determined by the setting of knob 16, the electrical circuit is interrupted. Pump 18 is connected over tubing 19, a safety valve 20, coupling 21, and return tubing 22 back to the muffler evaporator 3–5, thus forming a closed evaporator fluid circuit.

A blower, or fan 23, driven by an electric motor 24, is associated with condenser 14. Fan motor 24 is connected over lines 25, 26 and a switch 27 to the electrical circuit of the vehicle, shown schematically as battery 28. Switch 27 is the main switch for the heater. It controls all other electrical elements—pressure switch 17 over line 29, thermostat 9 over lines 30 and 31, and heater element 8 over line 32. The motor for pump 18 is supplied with current by branch line 33 from line 30.

In operation, let it be assumed that the engine of the vehicle is stopped. Muffler 3 is cold, and the channels 5 of heat exchanger 3–5 within the closed heat exchange fluid circuit, are also cold. If heat is demanded by the user, switch 27 is closed and fan, or blower motor 24 will start; the pressure sensitive switch 17 is closed due to the low pressure within the fluid circuit; thermostat 9 is closed due to the low temperature of thermostat 9; thus current will be supplied to pump 18 and to the heating unit 8. Pump 18 supplies liquid Freon through the cold muffler heat exchanger to the now operating heat exchanger 7 of heater unit 8, evaporating the heat exchange Freon therein. The flowing heat exchange fluid releases its heat content in condenser 14 to the interior of the vehicle. The heating effect is enchanced by blower 23. Pressure sensitive switch 17 prevents a temperature rise to an excessive value and disconnects pump 18 as well as heating unit 8 through the series connection with lines 30, 33, and 31, respectively, when the pressure rises above a predetermined limit, as set by knob 16 until this limit has been reached, however, pump 18 and heating unit 8, controlled by pressure switch 17 will continue to operate and heat will be supplied to the vehicle.

When the engine of the vehicle is started, the heat exchange fluid already in the first heat exchanger 3–5 will begin to evaporate. The need for fuel to supply heat from the second heat exchanger 7 will become less and less, as its temperature rises. At a predetermined temperature, for example 150° C., thermostat 9 will entirely disconnect heating unit 8 by interrupting its fuel supply. Heating and evaporating of the heat exchange fluid is thus entirely due to the heat obtained from exhaust pipes 1, 2; the fluid, as before, will condense in condenser 14 to heat the vehicle. The thermostat 9 may be arranged in such a manner that increased temperature causes progressive throttling of fuel supply before closing off the supply entirely at a predetermined temperature. If, for example, the temperature of the heat exchange fluid passing through the second heat exchanger 7 should drop to a point where liquid Freon flows through the second heat exchanger 7, because the amount of heat obtained from the first heat exchanger 3–5 is insufficient for complete evaporation of the heat exchange fluid, then auxiliary, or second heater unit 8 is switched ON again by thermostat 9. Such low values may occur, for example, when the engine is idling, or when the outside temperature is extremely low.

The second, or auxiliary heating unit 7, 8, is thus automatically connected when necessary by switching main switch 27, regardless of whether the motor or the vehicle is stopped or running, to provide even temperature, and regardless of outside temperature variations. Additional switches for the blower motor 24, or multiple speed arrangements for the blower, can of couse be used to control the fan or blower 23 separately, when the heating main switch 27 is closed.

I claim:

1. Vehicle heating arrangement comprising a muffler evaporator type heater exchanger; a fuel fired evaporator type heater exchanger; a condenser; means interconnecting said muffler heat exchanger, said fuel fired heat exchanger, and said condenser into a closed heat exchange fluid circuit; means pumping heat exchange fluid through said circuit in the order: muffler heat exchanger-fuel fired heat exchanger-condenser; means sensing the pressure of heat exchange fluid in said circuit; means sensing the temperature of heat exchange fluid at said fuel fired heat exchanger, and controlling fuel supply in accordance therewith; and means electrically serially connecting said pressure sensing means to said pump means and to said temperature sensing means whereby, upon coincidence of cold fluid at the fuel fired heat exchanger and low pressure in the fluid circuit, said fuel fired heat exchanger will be activated and, upon reaching a predetermined temperature or, upon supply of heated fluid from said muffler heater, below predetermined pressure in the fluid circuit, said fuel fired heat exchanger will be disconnected; and, upon pressure in said fuel circuit above a predetermined limit, said pump means and said fuel fired heat exchange means will be deactivated.

References Cited

UNITED STATES PATENTS

| | | | |
|---|---|---|---|
| 1,985,636 | 12/1934 | Foss | 237—12.3 |
| 2,193,141 | 3/1940 | Price | 237—2 |
| 3,072,176 | 1/1963 | Sunday | 237—12.3 |
| 3,236,453 | 2/1966 | Raymond | 237—12.3 |
| 3,280,903 | 10/1966 | Stoddard | 165—135 |

FOREIGN PATENTS

| | | |
|---|---|---|
| 500,881 | 2/1939 | Great Britain. |

EDWARD J. MICHAEL, *Primary Examiner.*